United States Patent
Sharma et al.

(10) Patent No.: US 9,825,865 B1
(45) Date of Patent: *Nov. 21, 2017

(54) STATISTICAL OPERATIONS ASSOCIATED WITH NETWORK TRAFFIC FORWARDING

(71) Applicant: CISCO TECHNOLOGY, INC., San Jose, CA (US)

(72) Inventors: Samar Sharma, San Jose, CA (US); Mouli Vytla, San Jose, CA (US); Nikhil Dhar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/696,200

(22) Filed: Apr. 24, 2015

Related U.S. Application Data

(60) Provisional application No. 62/138,283, filed on Mar. 25, 2015.

(51) Int. Cl.
- *H04L 12/26* (2006.01)
- *H04L 12/803* (2013.01)
- *H04L 12/733* (2013.01)

(52) U.S. Cl.
CPC ............ *H04L 47/125* (2013.01); *H04L 45/20* (2013.01)

(58) Field of Classification Search
CPC ..... H04L 12/26; H04L 12/743; H04L 12/803; H04L 12/911; H04L 12/935; H04L 29/06; H04L 29/08; H04L 45/20; H04L 45/125; H04L 47/125; H04L 47/726; H04L 47/7457; H04L 49/3009; H04L 67/1002; H04L 69/22; H04L 45/00; H04L 45/7457; H04L 47/70; H04L 63/101
See application file for complete search history.

(56) References Cited

U.S. PATENT DOCUMENTS

| | | | |
|---|---|---|---|
| 6,643,260 B1 | 11/2003 | Kloth | |
| 6,683,873 B1 * | 1/2004 | Kwok | H04L 29/06 370/389 |
| 6,735,631 B1 * | 5/2004 | Oehrke | H04L 41/12 709/201 |
| 6,996,615 B1 | 2/2006 | McGuire | |

(Continued)

OTHER PUBLICATIONS

USPTO Jan. 20, 2016 Non-Final Office Action from U.S. Appl. No. 14/687,712.

(Continued)

*Primary Examiner* — Tri H Phan
(74) *Attorney, Agent, or Firm* — Polsinelli PC

(57) ABSTRACT

In one embodiment, an indication of a plurality of network nodes and load balancing criteria is received. A plurality of forwarding entries are created, wherein a forwarding entry of the plurality of forwarding entries is based upon the load balancing criteria and corresponds to a network node of the plurality of network nodes. A network element applies the plurality of forwarding entries to data packets to load balance the data packets among the plurality of network nodes. A plurality of counts are tracked, wherein each count corresponds to at least one forwarding entry of the plurality of forwarding entries and represents the number of times the corresponding at least one forwarding entry is used to redirect a data packet.

20 Claims, 4 Drawing Sheets

| 300 | OPERATION | PORT IDENTIFIER | PROTOCOL | SOURCE IP RANGE | DESTINATION IP RANGE | COUNT |
|---|---|---|---|---|---|---|
| 302a | PERMIT | | IP | 200.200.0.0/16 | 224.0.0.0/4 | 12354 |
| 302b | PERMIT | | IP | 100.100.0.0/16 | 224.0.0.0/4 | 9459 |
| 302c | REDIRECT | (0x60) | IP | 200.200.0.0/255.255.0.192 | 224.0.0.0/4 | 5217 |
| 302d | REDIRECT | (0x60) | IP | 100.100.0.0/255.255.0.192 | 224.0.0.0/4 | 3465 |
| 302e | REDIRECT | (0x61) | IP | 200.200.0.64/255.255.0.192 | 224.0.0.0/4 | 5425 |
| 302f | REDIRECT | (0x61) | IP | 100.100.0.64/255.255.0.192 | 224.0.0.0/4 | 3572 |
| 302g | REDIRECT | (0x5f) | IP | 200.200.0.128/255.255.0.192 | 224.0.0.0/4 | 5312 |
| 302h | REDIRECT | (0x5f) | IP | 100.100.0.128/255.255.0.192 | 224.0.0.0/4 | 3517 |
| 302i | REDIRECT | (0x62) | IP | 200.200.0.192/255.255.0.192 | 224.0.0.0/4 | 5352 |
| 302j | REDIRECT | (0x62) | IP | 100.100.0.192/255.255.0.192 | 224.0.0.0/4 | 3457 |
| 302k | DENY | | IP | 0.0.0.0/0 | 0.0.0.0/0 | 279 |

(56) References Cited

U.S. PATENT DOCUMENTS

| | | | |
|---|---|---|---|
| 7,028,098 B2* | 4/2006 | Mate | H04L 47/50 709/238 |
| 7,062,571 B1 | 6/2006 | Dale | |
| 7,313,667 B1 | 12/2007 | Pullela | |
| 7,536,476 B1 | 5/2009 | Alleyne | |
| 7,567,504 B2* | 7/2009 | Darling | H04L 29/06 370/216 |
| 7,808,897 B1 | 10/2010 | Mehta et al. | |
| 8,284,664 B1 | 10/2012 | Aybay | |
| 8,510,469 B2 | 8/2013 | Portolani | |
| 8,611,356 B2* | 12/2013 | Yu | H04L 12/413 370/230 |
| 9,111,013 B2* | 8/2015 | Cheriton | G06F 17/30982 |
| 9,432,294 B1* | 8/2016 | Sharma | H04L 47/125 |
| 9,444,744 B1* | 9/2016 | Sharma | H04L 47/125 |
| 2003/0056001 A1 | 3/2003 | Mate | |
| 2004/0004941 A1 | 1/2004 | Malan | |
| 2004/0264481 A1* | 12/2004 | Darling | H04L 29/06 370/401 |
| 2005/0125424 A1 | 6/2005 | Herriott | |
| 2006/0104286 A1* | 5/2006 | Cheriton | G06F 17/30949 370/395.32 |
| 2006/0155875 A1 | 7/2006 | Cheriton | |
| 2008/0005293 A1* | 1/2008 | Bhargava | H04L 45/00 709/223 |
| 2008/0084880 A1* | 4/2008 | Dharwadkar | H04L 12/4641 370/392 |
| 2011/0055470 A1 | 3/2011 | Portolani | |
| 2011/0110382 A1 | 5/2011 | Jabr et al. | |
| 2011/0116443 A1 | 5/2011 | Yu et al. | |
| 2012/0201135 A1 | 8/2012 | Ding | |
| 2014/0006535 A1 | 1/2014 | Reddy | |
| 2014/0016476 A1* | 1/2014 | Dietz | H04L 43/0817 370/238 |
| 2014/0075108 A1 | 3/2014 | Dong | |
| 2014/0282611 A1 | 9/2014 | Campbell et al. | |
| 2014/0369204 A1* | 12/2014 | Anand | H04L 47/125 370/235.1 |
| 2014/0372567 A1* | 12/2014 | Ganesh | H04L 67/1002 709/219 |
| 2015/0117458 A1 | 4/2015 | Gurkan et al. | |
| 2015/0215819 A1* | 7/2015 | Bosch | H04W 24/02 370/221 |
| 2016/0094643 A1 | 3/2016 | Jain | |

OTHER PUBLICATIONS

USPTO Aug. 26, 2015 Non-Final Office Action from U.S. Appl. No. 14/696,209.

USPTO Feb. 10, 2016 Final Office Action from U.S. Appl. No. 14/696,209.

U.S. Appl. No. 14/687,712, filed Apr. 15, 2015, entitled "Utilizing User-Specified Access Control Lists in Conjunction With Redirection and Load-Balancing on a Port," Inventor(s): Samar Sharma, et al.

U.S. Appl. No. 14/693,925, filed Apr. 23, 2015, entitled "Selective Load Balancing of Network Traffic," Inventor(s): Samar Sharma, et al.

U.S. Appl. No. 14/696,209, filed Apr. 24, 2015, entitled "Line-Rate Selective Load Balancing of Permitted Network Traffic," Inventor(s): Samar Sharma, et al.

U.S. Appl. No. 14/696,226, filed Apr. 24, 2015, entitled "Load Balancing Methods for a Network Switch," Inventor(s): Samar Sharma, et al.

USPTO Dec. 9, 2016 Non-Final Office Action from U.S. Appl. No. 14/696,226.

U.S. Appl. No. 14/871,561, filed Sep. 30, 2015, entitled "Load Balanceing Methods Based on Transport Layer Port Numbers for a Network Switch," Inventor(s): Samar Sharma, et al.

USPTO May 3, 2017 Non-Final Office Action from U.S. Appl. No. 14/871,561.

U.S. Appl. No. 14/737,225, filed Jun. 11, 2015, entitled "Route Advertisement for Native Hardware-Based Virtual IP Address ("VIP") on Layer 2/Layer 3 Switch," Inventor(s): Samar Sharma, et al.

U.S. Appl. No. 14/728,839, filed Jun. 2, 2015, entitled "Internet Protocol Bucketing Mechanism to Classify and Process Network Traffic," Inventor(s): Samar Sharma, et al.

USPTO Feb. 2, 2017 Non-Final Office Action from U.S. Appl. No. 14/693,925.

* cited by examiner

| | OPERATION | PORT IDENTIFIER | PROTOCOL | SOURCE IP RANGE | DESTINATION IP RANGE | COUNT |
|---|---|---|---|---|---|---|
| 302a | PERMIT | | IP | 200.200.0.0/16 | 224.0.0.0/4 | 12354 |
| 302b | PERMIT | | IP | 100.100.0.0/16 | 224.0.0.0/4 | 9459 |
| 302c | REDIRECT | (0x60) | IP | 200.200.0.0/255.255.0.192 | 224.0.0.0/4 | 5217 |
| 302d | REDIRECT | (0x60) | IP | 100.100.0.0/255.255.0.192 | 224.0.0.0/4 | 3465 |
| 302e | REDIRECT | (0x61) | IP | 200.200.0.64/255.255.0.192 | 224.0.0.0/4 | 5425 |
| 302f | REDIRECT | (0x61) | IP | 100.100.0.64/255.255.0.192 | 224.0.0.0/4 | 3572 |
| 302g | REDIRECT | (0x5f) | IP | 200.200.0.128/255.255.0.192 | 224.0.0.0/4 | 5312 |
| 302h | REDIRECT | (0x5f) | IP | 100.100.0.128/255.255.0.192 | 224.0.0.0/4 | 3517 |
| 302i | REDIRECT | (0x62) | IP | 200.200.0.192/255.255.0.192 | 224.0.0.0/4 | 5352 |
| 302j | REDIRECT | (0x62) | IP | 100.100.0.192/255.255.0.192 | 224.0.0.0/4 | 3457 |
| 302k | DENY | | IP | 0.0.0.0/0 | 0.0.0.0/0 | 279 |

FIG. 3

STATISTICAL OPERATIONS ASSOCIATED WITH NETWORK TRAFFIC FORWARDING

RELATED APPLICATION

This application claims benefit under 35 U.S.C. §119(e) of U.S. Provisional Application Ser. No. 62/138,283, entitled "ENHANCED STATISTICAL OPERATIONS ASSOCIATED WITH NETWORK TRAFFIC," filed Mar. 25, 2015.

TECHNICAL FIELD

This disclosure relates in general to the field of communications and, more particularly, to statistical operations associated with network traffic forwarding.

BACKGROUND

A network element may include one or more ingress ports and one or more egress ports. The network element may receive network traffic through the ingress ports. As an example, network traffic may include one or more packets containing control information and data. The network element may perform various operations on the network traffic to select one or more of the egress ports for forwarding the network traffic. The network element then forwards the network traffic on to one or more devices coupled to the network element through the one or more egress ports.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 illustrates example traffic forwarding entries and associated count values in accordance with certain embodiments.

DETAILED DESCRIPTION OF EXAMPLE EMBODIMENTS

Overview

In one embodiment, an indication of a plurality of network nodes and load balancing criteria is received. A plurality of forwarding entries are created, wherein a forwarding entry of the plurality of forwarding entries is based upon the load balancing criteria and corresponds to a network node of the plurality of network nodes. A network element applies the plurality of forwarding entries to data packets to load balance the data packets among the plurality of network nodes. A plurality of counts are tracked, wherein each count corresponds to at least one forwarding entry of the plurality of forwarding entries and represents the number of times the corresponding at least one forwarding entry is used to redirect a data packet.

Example Embodiments

Figure 1:
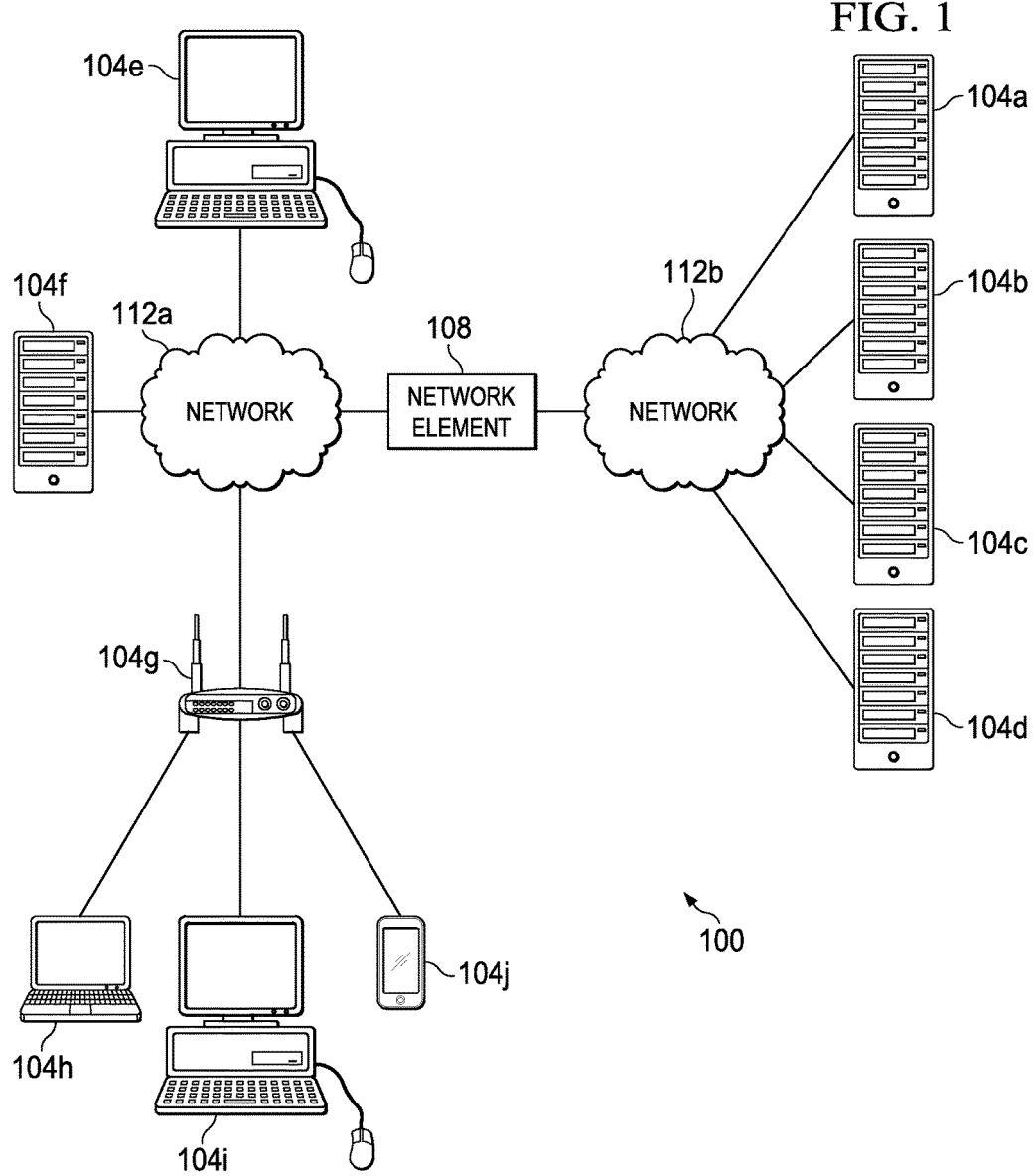
FIG. 1 illustrates a block diagram of a system for performing statistical operations associated with network traffic forwarding in accordance with certain embodiments.

FIG. 1 illustrates a block diagram of a system 100 for performing statistical operations associated with network traffic forwarding in accordance with certain embodiments. System 100 includes various network nodes 104 coupled to network element 108 via networks 112. In operation, network element 108 forwards network traffic (e.g., data packets) from one or more network nodes 104 or an internal component of network element 108 to one or more other network nodes 104 or an internal component of network element 108. In various embodiments, network element 108 may perform network traffic bridging (e.g., L2 bridging) based on forwarding tables linking destination media access control (MAC) addresses with ports of the network element 108. Network element 108 may implement various traffic customization information received from a user (e.g., a network administrator) associated with network element 108. As an example, a network administrator may indicate a device group comprising a plurality of two or more network nodes 104 and instruct network element 108 to load balance traffic that matches load balance criteria among the network nodes. Thus, the network element 108 may provide customization of the traffic forwarding by a network administrator.

As the number of network nodes in a network increases, complexity in the network increases as well. Thus a user may desire to examine various statistics associated with the forwarding of network traffic in order to efficiently manage the flow of traffic through network element 108. Various embodiments of the present disclosure include generating forwarding entries that implement load balancing and/or other network traffic forwarding functions and tracking the number of times each forwarding entry is applied to an incoming data packet. The counts may be presented to the user and/or they may be processed to form other statistics that are presented to the user.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with performing statistical operations associated with network traffic forwarding. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and/or receive information in a network environment. For example, network nodes may include network switches, routers, servers (physical servers or servers virtually implemented on physical hardware) (e.g., servers 104a-d and 104f), machines (physical machine or machines virtually implemented on physical hardware), end user devices (such as laptop 104*h*, desktop computers 104*e* and 104*i*, smartphone 104*j*), access points (e.g., 104*g*), cable boxes, gateways, bridges, loadbalancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

A network 112 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) and/or other communications for the transmission and/or reception of packets in a network.

Figure 2:
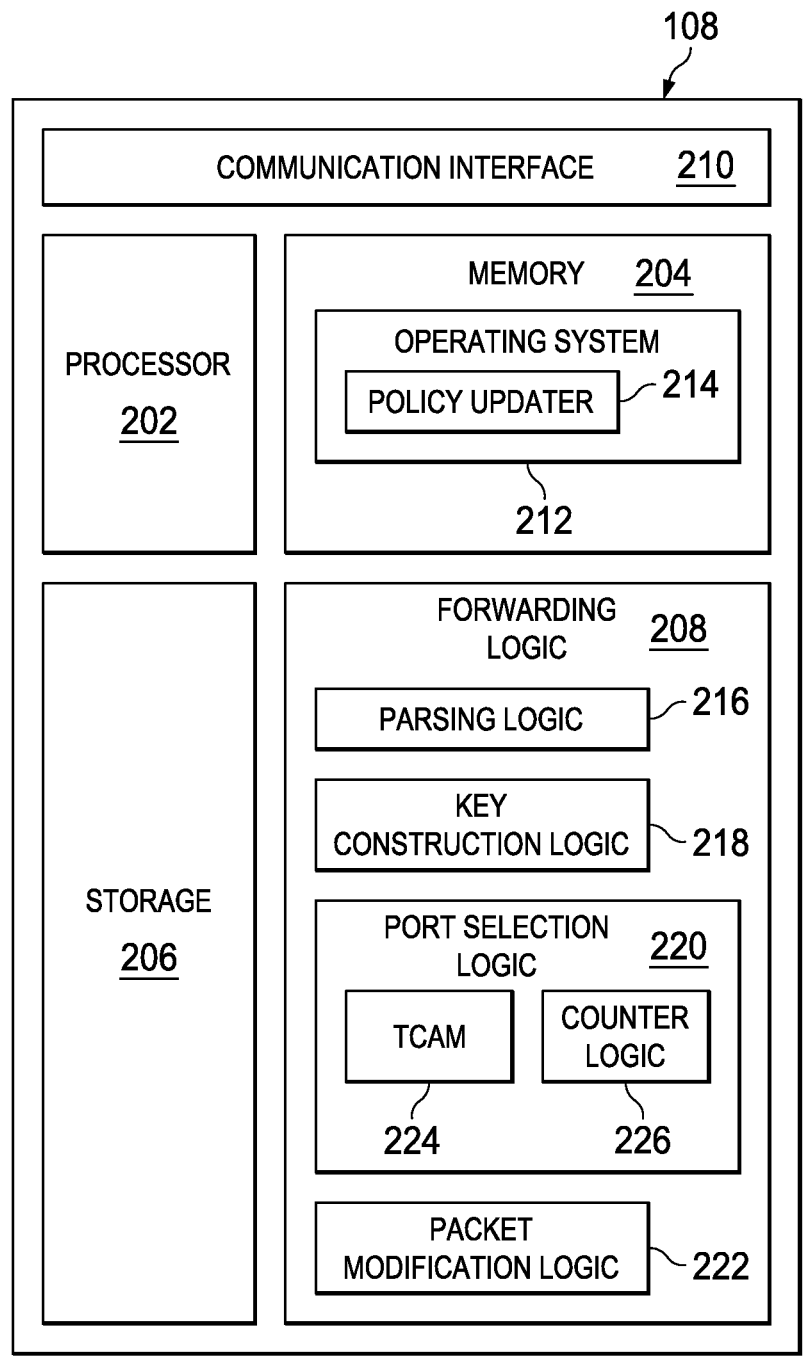
FIG. 2 illustrates a block diagram of a network element that performs statistical operations associated with network traffic forwarding in accordance with certain embodiments.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and/or a display. As an example, network element 108 comprises a computer system that includes one or more processors 202, memory 204, storage 206, and one or more communication interfaces 210. These components may work together in order to provide functionality described herein. Network element may also comprise forwarding logic 208. Forwarding logic 208 may be operable to implement user-specified traffic forwarding rules to traffic received via communication interface 210, collect statistics associated with the forwarding rules, and send the traffic processed by the rules to communication interface 210 for forwarding out of the appropriate port of network element 108.

Communication interface 210 may be used for the communication of signaling and/or data between network element 108 and one or more networks (e.g., 112*a* or 112*b*) and/or network nodes 104 coupled to a network 112. For example, communication interface 210 may be used to send and receive network traffic such as data packets. Each communication interface 210 may send and receive data and/or signals according to a distinct standard such as Asynchronous Transfer Mode (ATM), Frame Relay, or Gigabit Ethernet (or other IEEE 802.3 standard). In a particular embodiment, communication interface 210 comprises one or more ports that may each function as an ingress and/or egress port. As one example, communication interface 210 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 204 and/or storage 206 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 204 and/or storage 206 may store any suitable data or information utilized by network element 108, including software embedded in a computer readable medium, and/or encoded logic incorporated in hardware or otherwise stored (e.g., firmware). Memory 204 and/or storage 206 may also store the results and/or intermediate results of the various calculations and determinations performed by processor 202.

In certain example implementations, the customized traffic forwarding functions and statistical operations outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein may be construed as being encompassed within the broad term 'memory element.' Similarly, any of the potential processing elements, modules, and machines described in this Specification may be construed as being encompassed within the broad term 'processor.'

In one implementation, a network element 108 described herein may include software to achieve (or to facilitate) the functions discussed herein for customized traffic forwarding and associated statistical operations where the software is executed on one or more processors 202 to carry out the functions. This could include the implementation of one or more instances of an operating system 212, policy updater 214, and/or any other suitable elements that foster the activities discussed herein. In other embodiments, one or more of these elements may be implemented in hardware and/or firmware such as reprogrammable logic in an FPGA or ASIC.

In some embodiments, the operating system 212 provides an application program interface (API) that allows a network administrator to provide information to and receive information from the network element 108. For example, the API may allow the network administrator to specify traffic customization information such as one or more Access Control Lists (ACLs), load balancing criteria, redirection commands, or other information. As another example, the API may allow the network administrator to request and receive the results of statistical operations associated with network traffic forwarding. In various embodiments, a network administrator may specify the traffic customization information and statistical operations and view the results of the statistical operations through one or more interfaces, such as a command-line interface (CLI) (e.g., manually entered or entered via a script) or a graphical user interface (GUI) using any suitable programming language (e.g., Extensible Markup Language (xml) or Python). In various embodiments, the user may utilize a network node (e.g., node 104e) to communicate traffic customization and statistical operation information with network element 108 or may communicate directly with network element 108.

The operating system 212 may be capable of communicating the traffic customization information and requests associated with statistical operations received from the network administrator to other portions of network element 108 (e.g., to forwarding logic 208). In particular embodiments, the operating system 212 is operable to utilize a policy updater 214 to program logic of network element 108 based on traffic customization information and statistical operation requests received by the operating system 212 (e.g., from the network administrator).

In various embodiments, the operating system 212 receives traffic customization information (e.g., ACLs, load balancing criteria, redirection commands, or other information) and communicates with forwarding logic 208 to implement the traffic customization specified by the information. In various embodiments, the traffic customization information is converted into a format suitable for use by forwarding logic 208 (e.g., "forwarding entries" as described herein) before being communicated to forwarding logic 208. In other embodiments, the traffic customization information is received by the operating system 212 in a format used by forwarding logic 208, such that no conversion is needed. In yet other embodiments, forwarding logic 208 may convert the traffic customization information into a format suitable for use by forwarding logic 208. In some embodiments, the traffic customization information may be applied to traffic received via a single port of network element 108 or to traffic received through multiple ports of the network element. Different traffic customization information may be applied to different ports.

An ACL may be used to filter network traffic by controlling whether received packets are forwarded or blocked at one or more ports of the network element 108. An ACL may include one or more ACL entries. An ACL entry specifies matching criteria and an indication of whether packets that meet the matching criteria should be permitted (i.e., forwarded) or denied (i.e., blocked). Any suitable matching criteria may be specified, such as one or more identifiers associated with the source and/or destination of the packet or other identifier associated with the packet. For example, the matching criteria may include one or more source addresses (e.g., IP addresses, media access control (MAC) addresses, or other addresses identifiable in a data packet) and/or one or more destination addresses (e.g., IP addresses, MAC addresses, or other addresses). As another example, the matching criteria may include one or more source or destination L4 ports associated with (e.g., specified by) the packet. In some embodiments, the matching criteria may alternatively or additionally include one or more protocols (e.g., one or more L3 protocols such as IPv4 or IPv6 or one or more L4 protocols such as TCP or User Datagram Protocol (UDP)), one or more quality of service parameters (QoS), one or more virtual local area network (VLAN) identifiers, and/or other suitable information associated with (e.g., specified by) the packet. For example, an ACL entry may apply only to traffic associated with a single protocol (e.g., Hypertext Transfer Protocol [HTTP]) or may apply to traffic associated with multiple protocols (e.g., HTTP, Secure Sockets Layer [SSL], and File Transfer Protocol [FTP]). In some embodiments, an ACL may include separate ACL entries that are each associated with a different protocol.

Load balancing criteria may be used to load balance traffic matching the criteria among a plurality of network nodes. Any suitable matching criteria may be specified, such as one or more identifiers associated with the source and/or destination of an incoming data packet. For example, the matching criteria may include one or more source addresses (e.g., IP addresses, media access control (MAC) addresses, or other addresses identifiable in a data packet) and/or one or more destination addresses (e.g., IP addresses, MAC addresses, or other addresses). In some embodiments, the matching criteria may alternatively or additionally include one or more protocols (e.g., one or more L3 protocols such as IPv4 or IPv6 or one or more L4 protocols such as TCP or UDP), one or more QoS parameters, one or more virtual local area network (VLAN) identifiers, and/or other suitable information associated with (e.g., specified by) the packet. As another example, the matching criteria may include one or more source or destination L4 ports associated with (e.g., specified by) the packet.

Load balancing criteria may specify a load balancing scheme. For example, with respect to the embodiment depicted in FIG. 1, a load balancing scheme may specify how traffic forwarded by network element 108 is to be distributed among servers 104a-d. Network element 108 may load balance among any number of suitable network nodes 104, such as firewalls, application servers, other load balancers (e.g., load balancers that perform load balancing in software), inspection devices, etc.

In particular embodiments, a user may provide load balancing criteria specifying that particular traffic is load balanced while other traffic is not load balanced (e.g., the other traffic may be blocked according to criteria in a forwarding entry created based on an ACL entry or routed normally by using a forwarding table). In one embodiment, a network administrator or other entity associated with network element 108 may specify one or more destination addresses (e.g., a virtual IP address or range of virtual IP addresses of the network element 108) and one or more L4 parameters (such as one or more L4 protocols and/or L4 destination ports) as load balancing criteria. Thus, traffic matching this criteria will be load balanced among available load balancing network nodes while traffic not matching this criteria will be handled in another manner (e.g., according to a forwarding table or blocked by an forwarding entry that implements an ACL operation). In some embodiments, this criteria may be applied to traffic received at a particular port, at a group of logically associated ports, or at all ports of the network element 108.

In some embodiments, load balancing criteria may be expressed at a higher level of abstraction than one or more corresponding forwarding entries that are created based on the load balancing criteria. For example, load balancing criteria may merely specify that network traffic is to be split evenly among available servers of a device group (e.g., the four servers 104*a-d*) while the resulting forwarding entries may specify matching criteria and redirection information to implement the load balancing scheme specified by the initial load balancing criteria. As an example, network element 108 may receive load balancing criteria specifying that incoming traffic should be load balanced among a plurality of network nodes and may create a forwarding entry for each network node that specifies a distinct range of source IP addresses. Thus, when incoming network traffic matches the address range specified in a particular forwarding entry, the network traffic is redirected to the network node specified in the forwarding entry. In various embodiments, the forwarding entries may have other load balancing criteria that must also be met in order to be applied to incoming network traffic, such as any of the criteria described above.

The traffic customization information may be generated by any suitable entity, such as the network administrator or various features of network element 108. For example, traffic customization information may be received from any suitable feature of network element 108, such as a load balancing feature, a module implementing Web Cache Communication Protocol, a core policy (e.g., a policy that limits traffic going to processor 202 or a supervisor module associated with network element 108), etc. When traffic customization information is generated or received by a component of network element 108, the traffic customization information may be passed to the operating system 212. The operating system 212 (or other suitable component of network element 108) is responsible for facilitating the merging of the traffic customization information to create a set of forwarding entries that implement the traffic customization information. For example, one or more ACL entries may be merged with load balancing criteria to create forwarding entries that implement both the ACL entries and the load balancing criteria. The merging may be performed by any suitable element of network element 108, such as operating system 212, policy updater 214, forwarding logic 208, or other entity. When new traffic customization information is received (e.g., by operating system 212) for a particular port, the existing forwarding entries for that port may be updated to reflect integration of the traffic customization information with the traffic customization information already being used to forward traffic received on that port. The forwarding entries are programmed into a content addressable memory of port selection logic 220, such as TCAM 224 and used to forward traffic received on the associated port(s).

In various embodiments, operating system 212 or other network element component may update the forwarding entries resulting from the traffic customization information in response to a change in network topology (e.g., when an additional network node 104 becomes available to load balance or one of the network nodes 104*a-d* goes down). In particular embodiments, this may include changing a range of source IP addresses specified in each forwarding entry such that network traffic is distributed evenly (or unevenly if so specified by the load balancing scheme) among the available network nodes 104 in accordance with the load balancing criteria of the traffic customization information.

In particular embodiments, operating system 212 creates one or more additional forwarding entries after generating the forwarding entries from the traffic customization information. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may be placed in order of priority such that a traffic forwarding entry with a higher priority is checked for a match with a packet to be forwarded before the traffic forwarding entry with the lower priority is checked for a match with the packet. In other embodiments, traffic forwarding entries may each have a priority assigned to them, such that if network traffic matches multiple traffic forwarding entries, the traffic forwarding entry with the highest priority will be applied to the traffic. In some embodiments, a default forwarding entry (e.g., a forwarding entry specifying that all traffic should be permitted) has the lowest priority of the traffic forwarding entries. In various embodiments, the priorities of the traffic forwarding entries are based on user-specified rules associated with the traffic customization information that is merged to form the traffic forwarding entries.

As mentioned earlier, the policy updater 214 may be responsible for sending the forwarding entries to the forwarding logic 208 to be implemented. As one example, the policy updater 214 may instruct that the forwarding entries be programmed into a memory such as a content addressable memory (e.g., TCAM 224) of the port selection logic 220 (e.g., by calling a hardware driver associated with the TCAM).

Forwarding logic 208 is operable to apply the forwarding entries to network traffic received by network element 108. In the embodiment depicted, forwarding logic 208 includes parsing logic 216, key construction logic 218, port selection logic 220, and packet modification logic 222. In various embodiments, any suitable portion of forwarding logic 208 may comprise programmable logic (e.g., software/computer instructions executed by a processor), fixed logic, programmable digital logic (e.g., an FPGA, an EPROM, an EEPROM, or other device), an ASIC that includes digital logic, software, code, electronic instructions, or any suitable combination thereof. In a particular embodiment, forwarding logic 208 comprises an ASIC or other device that is operable to perform customized traffic forwarding in hardware by utilizing logic (e.g., one or more memories such as TCAM 224) that is reprogrammable by an entity (e.g., the operating system 212) based on traffic customization information (e.g., received from a network administrator). In such an embodiment, the functions of parsing logic 216, key construction logic 218, port selection logic 220, and packet modification logic 222 are performed in hardware by such logic (in contrast to an implementation where such functions may be performed through software instructions executed by a network processor). Reconfiguration of the logic may be performed by storing different values in memory of the forwarding logic 208 such as TCAM 224 or other memory element while the rest of the forwarding logic 208 remains fixed. In various embodiments, the values stored in the memory may provide control inputs to forwarding logic 208, but are not typical instructions that are part of an instruction set executed by a processor. By implementing this logic in hardware, the network element 108 may process incoming traffic (e.g., switch/bridge the traffic) at much higher speeds (e.g., at line rate) than an appliance that utilizes a network processor to process incoming network traffic.

Parsing logic 216 may be operable to receive packets from the ingress ports of network element 108. The parsing logic 216 may be configured to parse information from a received packet. Parsing logic 216 may be configured to parse any suitable information, such as one or more protocols associated with (e.g., included within) the packet, a source address (e.g., IP address, MAC address, or other address) of the packet, a destination address (e.g., IP address, MAC address, or other address) of the packet, one or more ports (e.g., source or destination L4 port) associated with the packet, a VLAN identifier, a QoS value, or other suitable information from the packet. In some embodiments, the information to be parsed by parsing logic 216 is based on the information included within various forwarding entries of network element 108 (which could include forwarding entries associated with various different ports of network element 108). In some embodiments, the parsing logic 216 is configured on a port-by-port basis, such that packets from each port may be parsed based on the forwarding entries associated with that port.

The information parsed by parsing logic 126 is passed to key construction logic 218. Key construction logic constructs a key from the output of the parsing logic 126. The key may contain all or a portion of the information parsed from a packet. The key is then passed to the port selection logic 220.

Prior to receiving a key associated with a data packet, port selection logic 208 may receive forwarding entries (or ACL or load balancing criteria) from operating system 212 and configure itself to implement the forwarding entries. For example, port selection logic 208 may store forwarding entries associated with a particular port in a content addressable memory, such as a TCAM 224. When a packet is received on that port, the key generated by key construction logic 218 (and any other suitable information associated with the packet) may be passed to the port selection logic 220. The port selection logic 220 uses the key to perform a lookup in the TCAM 224. Port selection logic 220 will then forward the traffic through the appropriate port of network element 108 in accordance with the forwarding entry that matches the information in the key from the packet (and has the highest priority if multiple forwarding entries match the key). If the packet is to be redirected (e.g., because the key matches the specified load balancing criteria or redirection criteria), packet modification logic may modify the appropriate fields of the packet (e.g., destination IP address and/or destination MAC address) before the packet is forwarded out of the appropriate egress port of network element 108. If the packet is not to be redirected according to load balancing criteria or redirection criteria, then the usual forwarding process may be applied to the packet (as long as the packet is not blocked by a forwarding entry implementing an ACL entry). For example, port selection logic 218 may access a forwarding table (e.g., based on a destination address of the packet) to determine which port to forward the packet to. In some embodiments, the forwarding table is stored in a separate memory (e.g., static random access memory) from the forwarding entries (e.g., TCAM 224).

In particular embodiments, any or a combination of the parsing of the packet, the construction of the key, and the identification of a forwarding entry applicable to a packet may occur at a line rate of the network element (e.g., within a single cycle of a clock of the network element used to clock incoming data).

In various embodiments of the present disclosure, the port forwarding logic 208 may track the number of times one or more of the forwarding entries are applied to (i.e., used to forward) incoming data packets. Such functionality may be provided by counter logic 226. Counter logic 226 is operable to maintain counts that each correspond with one or more traffic forwarding entries (e.g., those stored in TCAM 224).

Counter logic 226 may be operable to receive one or more enable signals from another component of network element 108 (e.g., operating system 212) and begin tracking counts in response to the enable signal(s). For example, the signal may be a global enable signal that enables each count of network element 108 or each count associated with one or more particular ports to be tracked. As another example, an enable signal may correspond to a single count or multiple counts, such that only the corresponding counts are enabled by the signal. In various embodiments, counter logic 226 may also receive one or more disable signals from another component of network element 108 and stop tracking the relevant counts in response to the disable signal(s) (which may also each apply to one or more counts). In various embodiments, counter logic 226 may either pause or reset the corresponding counts in response to receiving the disable signal(s).

Counter logic 226 may also be operable to receive one or more reset signals from another component of network element 108 (e.g., operating system 212) and reset the corresponding counts in response to the reset signal(s). As one example, the signal may be a global reset signal that resets each count in network element 108 or each count associated with one or more particular ports. As another example, a reset signal may correspond to a single count or multiple counts, such that only the corresponding counts are reset by the reset signal.

In some embodiments, the enable signals, disable signals, and reset signals may be received and implemented at runtime. That is, these signals may be received and their respective operations performed by counter logic 226 while the network element 108 is actively involved in forwarding traffic. Counter logic 226 may be operable to reconfigure the counts it is tracking based on any suitable command received or upon a reconfiguration of forwarding entries for which the counter logic 226 is maintaining counts.

In one embodiment, each traffic forwarding entry corresponds to a different count maintained by counter logic 226. In other embodiments, a count may be kept for multiple forwarding rules (e.g., whenever any of the forwarding entries associated with a particular count are applied to an incoming packet, the count will be incremented). Such embodiments might include, for example, a count being kept for forwarding rules that are common across multiple ports or a count applying to a particular egress port (e.g., to track the number of packets that are sent to a particular network node 104 when multiple different forwarding entries direct packets to that node).

Counter logic 226 may include any suitable logic, such as one or more counters that are each operable to increment a count value. In particular embodiments, counter logic 226 may include any suitable number of counters. For example, counter logic 226 may include a counter for each possible memory (e.g., TCAM) entry to hold a traffic forwarding entry, a counter for each traffic forwarding entry, a counter for each port, a counter for each destination node of a load balancing scheme, or other suitable number of counters. In some embodiments, the number of counters utilized by counter logic 226 is dynamically configurable based on the number of forwarding rules.

The count value associated with a particular forwarding entry may be incremented each time an associated forwarding entry is used to forward traffic. As an example, when a forwarding entry is matched with a key constructed from an incoming packet, the current value of the count associated with the forwarding entry is accessed and provided to a counter associated with the forwarding entry. The counter will increment the count value and provide the incremented value for storage. When a forwarding entry associated with the count value is applied to an incoming data packet, the new count value is provided to the counter and the process repeats itself.

Counter logic 226 may store the count values in any suitable location. For example, counter logic 226 may store the count values in TCAM 224 or other memory of the forwarding logic 226. In one embodiment, counter logic 226 stores the count values in memory that is also used to store associations between a port identifiers of a first type (which may be arbitrary and take up limited space in the TCAM 224) included in forwarding entries and port identifiers of a second type (which may identify the actual ports of network element 108). In another embodiment, counter logic 226 stores the count values in the same memory used to store one or more forwarding tables utilized by network element 108. In particular embodiments, the memory used to store the count values may be a static random access memory. In yet other embodiments, each counter of the counter logic 226 includes one or more sets of registers to store the count value(s) incremented by the counter.

Upon receiving a read command from another component of network element 108 (e.g., operating system 212), counter logic 226 may retrieve one or more count values specified by the read command. For example, the read command may be a global read command that retrieves all of the count values of network element 108 or all of the count values associated with one or more particular ports of network element 108. As another example, the read command may specify one or more particular count values to retrieve. In response, counter logic 226 may retrieve the relevant count value(s) from memory and provide them to the requesting entity (e.g., operating system 212).

Operating system 212 may facilitate the provision of count values or statistics derived therefrom to a user of network element 108 or a network node coupled to network element 108. In various embodiments, the user may provide commands (e.g., directly to operating system 212 or other component of network element 108 or to a network node 104 that passes the commands to network element 108) to start collecting one or more count values, stop collecting one or more count values, pause the tracking of one or more count values, resume the tracking of one or more count values, reset the tracking of count values, read one or more of the count values, request data derived from one or more count values, and/or any other suitable command with respect to the count values. Each command may be associated with any suitable count values. For example, a command may be associated with an entire port, such that the command is applied to all counts associated with the forwarding entries applicable to incoming traffic on that port. As another example, a command may be associated with the entire network element 108 such that the command is applied to all counts to be tracked by the network element 108. As another example, a command may apply to one or more particular forwarding entries, ingress ports, egress ports (e.g., to counts associated with forwarding entries that redirect traffic to such ports), traffic customization information used to form one or more forwarding entries, or other suitable arrangement of one or more counts. In a particular embodiment, network element 108 may be identified by a plurality of virtual IP addresses (wherein traffic having a destination IP address that matches one of the virtual IP addresses is sent to the network element 108 by a network). In some embodiments, a command may be associated with a particular VIP address such that it is applied to counts associated with forwarding entries applicable to traffic sent to that particular VIP address. As one example, each VIP address may be associated with one or more ingress ports of the network element and a command associated with a VIP address may be applied for each of those ports.

Network element 108 may receive the commands from the user and generate any necessary signaling to effectuate the commands. In particular embodiments, the user may request that count value data (e.g., one or more count values or values derived therefrom) be provided periodically. For example, the user may request that the count value data be updated every second, every five seconds, every minute, or at any other suitable interval. Operating system 212 or other component of network element may then poll the necessary count values at the requested interval. Upon receiving the count values, the operating system 212 or other component of network element may provide the raw count values to the user (e.g., via network node 104) and/or may process the values and provide the processed information to the user. In some embodiments, when the raw data is provided to network node 104, the network node 104 may process the count values and provide the processed information to the user (e.g., via a display).

Any suitable processing may be performed on the count values before the resulting data is presented to the user. For example, various count values may be aggregated (e.g., different count values for forwarding entries that forward traffic to a particular port might be combined). As another example, the count values might be averaged over a period of time (e.g., the number of times the count value was incremented per second may be calculated). As another example, various count values may be converted to percentage values that are indicative of how often the associated forwarding entries were applied relative to each other. Such an embodiment would allow a user to assess how much of particular incoming traffic (e.g., on a port) was sent to particular network nodes through particular ports. Thus, a user could verify whether a particular load balancing scheme is balancing network traffic in the intended manner. In some embodiments, the count value data may be associated with a virtual IP address of the network element 108, such that a user may view separate count value data for each virtual IP address. The raw count values or other statistics processed therefrom that are presented to the user may be categorized in any suitable manner, such as per forwarding entry (or combination of forwarding entries), per ingress port (or logical grouping of ingress ports), per egress port (or logical grouping of egress ports), per virtual IP address (or group of virtual IP addresses) of network element 108, per line card (if network element 108 is a line card of a larger system), or other suitable grouping.

The data collected and presented to the user may change dynamically based on network conditions. For example, if a network node 104 configured to receive traffic in a load balancing scheme goes down and the forwarding entries are adjusted accordingly to load balance among the remaining operating network nodes, the count value data presented to the user may also be adjusted automatically.

FIG. 3 illustrates example traffic forwarding entries 302 and associated count values in accordance with certain embodiments. A traffic forwarding entry 302 specifies matching criteria and an indication of how traffic matching the criteria should be forwarded. For example, the traffic forwarding entry may indicate that the traffic matching the criteria should be forwarded to a particular port (see, e.g., entries 302c-302j), that the traffic matching the criteria should be permitted to be forwarded in a normal manner (e.g., based on a destination MAC address of the packet using a forwarding table) (see, e.g., entries 302a and 302b), or that the traffic matching the criteria should be denied (see, e.g., entry 302k). In various embodiments, the forwarding entries may be utilized by forwarding logic 208 (e.g., the entries may be stored in TCAM 224 and utilized by hardware to forward incoming network traffic). A forwarding entry may specify any suitable matching criteria that may be included in a data packet. In the embodiment depicted, the matching criteria of various forwarding entries includes an L3 protocol, a source IP address range, and a destination IP address range.

A forwarding entry may specify one or more source and/or destination IP addresses using any suitable format, such as Classless Inter-Domain Routing (CIDR) notation or IP address/mask notation. For example, forwarding entry 302a specifies a source IP address range of 200.200.0.0/16, specifying that network traffic specifying a source IP address having a value of 200 in its first octet and 200 in its second octet would match this criteria. As another example, forwarding entry 302c specifies a source IP address range expressed as an IP address ("200.200.0.0") and a mask ("255.255.0.192"). When compared against a source IP address of an incoming data packet, the mask may be applied to the source IP address of the packet (e.g., a logical AND operation may be applied with the mask and the source IP address) and the result is compared against the source IP address specified by the forwarding entry to determine whether a match occurs. This allows specification of one IP address or multiple IP addresses using a common format (i.e., IP address and mask).

The forwarding entries depicted in block 300 may be formed by merging various traffic customization information. For example, the traffic forwarding entries depicted in block 300 could have been formed from an ACL entry permitting traffic having a source IP address within the range of 200.200.0.0/16 regardless of its destination IP address, another ACL entry permitting traffic having a destination IP address within the range of 224.0.0.0/4 regardless of its source IP address, and a IP source address based load balancing scheme spreading traffic intended to spread traffic equally among ports identified as 0x60, 0x61, 0x5f, and 0x62 in the traffic forwarding entries. Forwarding entry 302k may be a default forwarding entry meant to block all IP traffic that does not match any of the other forwarding entries in block 300. For example, entry 302k denotes that traffic having any source IP address or destination IP address should be denied. In the embodiment depicted, forwarding entry 302k would have a lower priority than the other forwarding entries such that it would only be applied if network traffic didn't match any of the other forwarding entries. Similarly, the forwarding entries 302a and 302b may have a lower priority than forwarding entries 302c-302j in order to allow load balancing to be performed ahead of application of the forwarding entries that implement on one or more ACLs.

The embodiment depicted is a simplified example. In other embodiments, any other actions may be applied to incoming traffic. For example, particular traffic could be redirected, blocked, or permitted according to any suitable criteria set by the network administrator, network element 108, and/or other entity.

As depicted, each forwarding entry is associated with a count. The value of the count tracks the number of times the associated forwarding entry is applied to the incoming data packets. In the embodiment depicted, the traffic having a destination IP address range within 224.0.0.0/4 and having a source IP address with the first two octets each having a value of 200 is distributed fairly equally as evidenced by the count values associated with forwarding entries 302c, 302e, 302g, and 302i. Similarly, the traffic having a destination IP address range within 224.0.0.0/4 and having a source IP address with the first two octets each having a value of 100 is distributed fairly equally as evidenced by the count values associated with forwarding entries 302d, 302f, 302h, and 302j.

Figure 4:
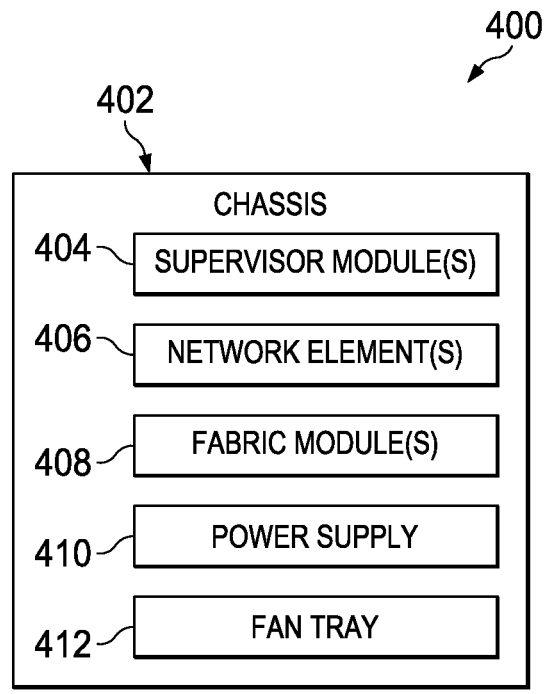
FIG. 4 illustrates a block diagram of one or more network elements embodied within a chassis in accordance with certain embodiments.

FIG. 4 illustrates a block diagram 400 of one or more network elements embodied within a chassis 402 in accordance with certain embodiments. Chassis 402 may include various slots configured to electrically and mechanically couple to various circuit boards (e.g., line cards), such as one or more supervisor module(s) 404, one or more network elements(s) 406, one or more fabric module(s) 408, one or more power supplies (410), one or more fan trays 412, or other components. In various embodiments, a network element 408 may correspond to network element 108. In other embodiments, the entire chassis 402 may correspond to network element 108.

A supervisor module 404 may include a computer system with at least one processor and may be operable to scale the control plane, management, and data plane services for the chassis and its components. A supervisor module 404 may control the Layer 2 and 3 services, redundancy capabilities, configuration management, status monitoring, power and environmental management of the chassis and its components. In some embodiments, supervisor module 404 provides centralized arbitration to the system fabric for all line cards.

Supervisor module 404 may run an operating system, such as Cisco NX-OS or other operating system, designed to support distributed multithreaded processing on symmetric multiprocessors (SMPs), multicore CPUs, and distributed line-card processors. Computationally intensive tasks, such as hardware table programming, can be offloaded to dedicated processors distributed across the line cards. Modular processes of the operating system may be instantiated on demand, each in a separate protected memory space. Thus, processes are started and system resources allocated only when a feature is enabled.

In a particular embodiment supervisor module 404 receives commands from users, processes these commands, and sends relevant configuration information to the appropriate network elements 406. For example, a user may send one or more load balancing criteria and one or more ACLs to supervisor module 404. Supervisor module may generate traffic forwarding entries based on the load balancing criteria and ACLs. Supervisor module 404 may also determine which ports the criteria and ACLs apply to and then send the forwarding entries to the relevant network element 406. Similarly, supervisor module 404 may receive commands associated with counts and determine which network element 406 the command is associated with and then send the commands to the appropriate network element. In some embodiments, supervisor module 404 may host an operating system that performs any suitable processing of count values described herein.

Network element 406 may include a distributed forwarding engine for L2/L3 forwarding. Network element 406 may include integrated hardware support for protecting the supervisor CPU from excessive traffic; for providing ACL counters and logging capability, for providing Layer 2 to Layer 4 ACL for both IPv4 and IPv6 traffic, and any other characteristics described herein with respect to network element 108.

Fabric module 408 is capable of coupling the various network elements 406 in the chassis together (e.g., through their respective ports). In connection with the supervisor module 404 and network elements 406, the fabric module 408 may provide virtual output queuing (VoQ) and credit-based arbitration to a crossbar switch to increase performance of the distributed forwarding system implemented by chassis 402.

Chassis 402 may also include one or more power supplies 410 for powering the various components of chassis 402 and one or more fan trays 412 for cooling the various components of chassis 402.

Figure 5:
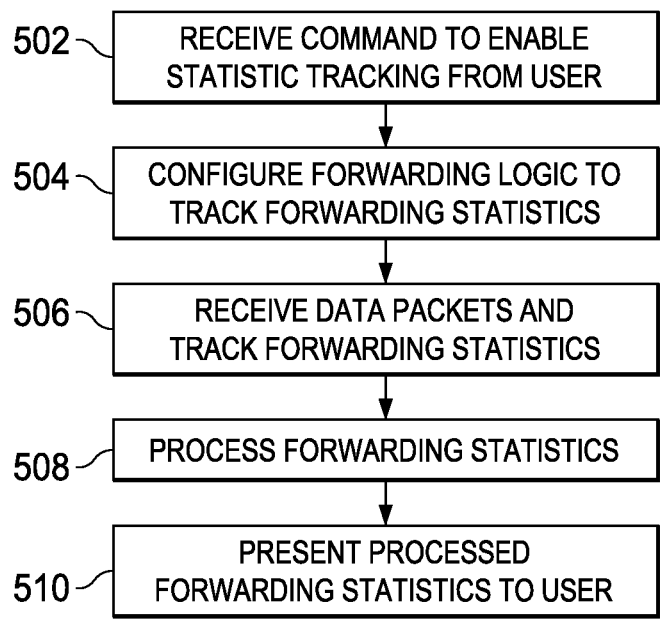
FIG. 5 illustrates an example method for performing statistical operations associated with network traffic forwarding in accordance with certain embodiments.

FIG. 5 illustrates an example method for performing statistical operations associated with network traffic forwarding in accordance with certain embodiments. The method begins at step 502, where a command to enable the tracking of statistics is received from a user. As explained above, the command may apply to any suitable traffic forwarding entries implemented by network 108. In some embodiments, the command may specify how often the requested statistics should be reported back to the user. The command may also specify a format in which to present statistics to the user (e.g., various count values may be aggregated and then presented to the user).

At step 504, forwarding logic of a network element is configured to track forwarding statistics. This may involve provision of memory space, reconfiguration of logic, or any other suitable operations. In some instances, this step may involve a network element sending one or more enable signals to the forwarding logic to begin (or resume) tracking count values.

At step 506, data packets are received and forwarding statistics are tracked. A forwarding statistic may comprise raw count values or other values based on one or more of the raw count values. As explained above, various counters in the forwarding logic may increment count values when associated traffic forwarding entries are applied to the data packets. At step 508, the forwarding statistics are processed. As explained above, various count values may be aggregated, averaged, or otherwise manipulated to form other forwarding statistics complying with a command received from the user. At step 510, the processed forwarding statistics are presented to the user (e.g., via a display of the network element 108 or a network node coupled to the network element).

Some of the steps illustrated in FIG. 5 may be repeated, combined, modified or deleted where appropriate, and additional steps may also be added to the flowchart. Additionally, steps may be performed in any suitable order without departing from the scope of particular embodiments.

It is also important to note that the steps in FIG. 5 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Additionally, it should be noted that with the examples provided above, interaction may be described in terms of one or more network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of selectively load balancing network traffic, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method comprising:
receiving an indication of a plurality of network nodes and load balancing criteria;
creating a plurality of forwarding entries, a forwarding entry of the plurality of forwarding entries based upon the load balancing criteria and corresponding to a network node of the plurality of network nodes;

applying, by a network element, the plurality of forwarding entries to data packets to load balance the data packets among the plurality of network nodes; and tracking a plurality of counts, each count corresponding to at least one forwarding entry of the plurality of forwarding entries, a count representing the number of times the corresponding at least one forwarding entry is used to redirect a data packet.

2. The method of claim 1, further comprising resetting at least one of the counts while the network element continues to apply the plurality of forwarding entries to data packets to load balance the data packets.

3. The method of claim 1, further determining at least one statistic based on at least one of the plurality of counts and sending the at least one statistic through a network for presentation to a user.

4. The method of claim 3, wherein the at least one statistic comprises a percentage of data packets sent to a network node of the plurality of network nodes corresponding to at least one forwarding entry of the plurality of forwarding entries.

5. The method of claim 3, wherein the at least one statistic comprises an average number of data packets sent to a network node of the plurality of network nodes corresponding to at least one forwarding entry of the plurality of forwarding entries as a function of time.

6. The method of claim 1, further comprising bridging, by the network element, data packets between network nodes coupled to the network element.

7. The method of claim 1, wherein the plurality of forwarding entries are stored in a ternary content addressable memory of the network element.

8. The method of claim 1, further comprising tracking at least one count corresponding to at least one forwarding entry that is used to forward traffic that does not meet the load balancing criteria.

9. The method of claim 1, wherein the network element determines whether any of the plurality of forwarding entries applies to a data packet within a single clock cycle of the network element.

10. The method of claim 1, wherein the tracking the plurality of counts is initiated in response to a command received from a network node coupled to the network element via a network.

11. An apparatus comprising:
at least one memory element to store a plurality of forwarding entries, a forwarding entry of the plurality of forwarding entries based upon load balancing criteria and corresponding to a network node of a plurality of network nodes; and
forwarding logic to:
apply the plurality of forwarding entries to data packets to load balance the data packets among the plurality of network nodes; and
track a plurality of counts, each count corresponding to at least one forwarding entry of the plurality of forwarding entries, a count representing the number of times the corresponding at least one forwarding entry is used to redirect a data packet.

12. The apparatus of claim 11, wherein the forwarding logic is further to reset at least one of the counts while the forwarding logic continues to apply the plurality of forwarding entries to data packets to load balance the data packets.

13. The apparatus of claim 11, wherein the forwarding logic is further to bridge data packets between network nodes coupled to the apparatus.

14. The apparatus of claim 11, wherein the memory element comprises a ternary content addressable memory.

15. The apparatus of claim 11, wherein the forwarding logic is to determine whether any of the plurality of forwarding entries applies to a data packet within a single clock cycle of the apparatus.

16. A computer-readable non-transitory medium comprising one or more instructions that when executed by a processor configure the processor to cause programmable logic to perform operations comprising:
receiving an indication of a plurality of network nodes and load balancing criteria;
creating a plurality of forwarding entries, a forwarding entry of the plurality of forwarding entries based upon the load balancing criteria and corresponding to a network node of the plurality of network nodes;
configuring forwarding logic of a network element to apply the forwarding entries to data packets to load balance the data packets among the plurality of network nodes; and
tracking a plurality of counts, each count corresponding to at least one forwarding entry of the plurality of forwarding entries, a count representing the number of times the corresponding at least one forwarding entry is used to redirect a data packet.

17. The medium of claim 16, wherein the operations further comprise resetting at least one of the counts while the network element continues to apply the plurality of forwarding entries to data packets to load balance the data packets.

18. The medium of claim 16, wherein the network element is to bridge data packets between network nodes coupled to the network element.

19. The medium of claim 16, wherein the forwarding entries are to be stored in a ternary content addressable memory.

20. The medium of claim 16, wherein the forwarding logic is to determine whether any of the plurality of forwarding entries applies to a data packet within a single clock cycle of the apparatus.

* * * * *